United States Patent
Swab

(10) Patent No.: US 10,941,713 B2
(45) Date of Patent: Mar. 9, 2021

(54) MULTI-FUEL TRANSPORT REFRIGERATION UNIT

(71) Applicant: CARRIER CORPORATION, Palm Beach Gardens, FL (US)

(72) Inventor: Michael Swab, Acworth, GA (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 106 days.

(21) Appl. No.: 16/304,432

(22) PCT Filed: May 23, 2017

(86) PCT No.: PCT/US2017/034053
§ 371 (c)(1),
(2) Date: Nov. 26, 2018

(87) PCT Pub. No.: WO2017/205412
PCT Pub. Date: Nov. 30, 2017

(65) Prior Publication Data
US 2019/0145325 A1 May 16, 2019

Related U.S. Application Data

(60) Provisional application No. 62/342,509, filed on May 27, 2016.

(51) Int. Cl.
*F02D 19/06* (2006.01)
*F02M 21/02* (2006.01)
(Continued)

(52) U.S. Cl.
CPC ....... *F02D 19/0605* (2013.01); *B60H 1/3226* (2013.01); *B60H 1/3232* (2013.01);
(Continued)

(58) Field of Classification Search
CPC ............. F02D 19/0605; F02D 19/0665; F02D 19/0694; F02D 19/0647; F02D 19/06;
(Continued)

(56) References Cited

U.S. PATENT DOCUMENTS 5,259,198 A    11/1993    Viegas et al.
6,223,546 B1    5/2001    Chopko et al.
(Continued)

FOREIGN PATENT DOCUMENTS

CN    201357733 Y    12/2009
CN    104806352 A    7/2015
(Continued)

OTHER PUBLICATIONS

Carley; CNG and Propane Engine Builds, Engine Builder, Babcox, May 15, 2015; Internet; URL: http://www.enginebuildermag.com/2015/05/cng-and-propane-engine-builds/; 21 pgs.
(Continued)

*Primary Examiner* — Jacob M Amick
(74) *Attorney, Agent, or Firm* — Cantor Colburn LLP

(57) ABSTRACT

A transport refrigeration system (20) having: a multi-fuel capable engine (26); a refrigeration unit (22) powered by the engine (26); a first fuel system (120, 130, 140, 150) operably connected to the engine (26), the first fuel (120, 130, 140, 150) system including at least one of a propane fuel system (120), compressed natural gas fuel system (130), liquefied natural gas fuel system (140), and gasoline fuel system (150); a second fuel system (120, 130, 140, 150) operably connected to the engine (26), the second fuel system (120, 130, 140, 150) including at least one of a propane fuel system (120), compressed natural gas fuel system (130), liquefied natural gas fuel system (140), and gasoline fuel system (150); and a controller (30) configured to command a fuel to the engine (26) from the first fuel system (120, 130,
(Continued)

140, 150) or the second fuel system (120, 130, 140, 150), the controller (30) adjusts operation of the engine (26) in response to the fuel commanded. The first fuel system (120, 130, 140, 150) operates on a fuel different than the second fuel system (120, 130, 140, 150). Both fuel systems (120, 130, 140, 150) are separate modules being removably connected to the engine (26).

18 Claims, 1 Drawing Sheet

(51) Int. Cl.
| | | |
|---|---|---|
| *B60H 1/32* | (2006.01) | |
| *B60P 3/20* | (2006.01) | |
| *F25D 29/00* | (2006.01) | |
| *F25B 27/00* | (2006.01) | |
| *F02B 65/00* | (2006.01) | |
| *F02D 41/00* | (2006.01) | |
| *F02M 21/06* | (2006.01) | |

(52) U.S. Cl.
CPC ............... *B60P 3/20* (2013.01); *F02B 65/00* (2013.01); *F02D 19/0647* (2013.01); *F02D 19/0665* (2013.01); *F02D 19/0681* (2013.01); *F02D 19/0694* (2013.01); *F02D 41/0027* (2013.01); *F02M 21/0212* (2013.01); *F02M 21/0215* (2013.01); *F02M 21/0221* (2013.01); *F02M 21/0242* (2013.01); *F02M 21/06* (2013.01); *F25B 27/00* (2013.01); *F25D 29/003* (2013.01); *B60H 2001/3266* (2013.01); *F25B 2327/001* (2013.01)

(58) Field of Classification Search
CPC ............... F02D 19/0602; F02D 19/061; F02D 19/0613; F02D 19/0639; F02D 19/0642; F02D 19/0663; F02D 19/0673; F02D 19/0681; B60H 1/3226; F02M 21/0212; F02M 21/06; F02M 21/0215; F02M 21/0221; F02B 65/00
See application file for complete search history.

(56) References Cited

U.S. PATENT DOCUMENTS

| | | | |
|---|---|---|---|
| 9,186,958 B2 | 11/2015 | Lurken et al. | |
| 9,696,066 B1* | 7/2017 | Green | F02D 19/0642 |
| 2011/0265506 A1 | 11/2011 | Alston | |
| 2013/0248165 A1 | 9/2013 | Kandasamy | |
| 2014/0090723 A1* | 4/2014 | Toale | F02M 21/0239 |
| | | | 137/487.5 |
| 2014/0138045 A1 | 5/2014 | Sloane | |
| 2015/0101566 A1 | 4/2015 | Leone et al. | |
| 2015/0291007 A1 | 10/2015 | Ayres et al. | |
| 2015/0314670 A1 | 11/2015 | Lucht et al. | |
| 2015/0369189 A1* | 12/2015 | Teets | F02M 37/0052 |
| | | | 123/447 |
| 2016/0201580 A1* | 7/2016 | Ivers | F02D 19/0605 |
| | | | 180/309 |

FOREIGN PATENT DOCUMENTS

| | | |
|---|---|---|
| CN | 104884773 A | 9/2015 |
| CN | 105089857 A | 11/2015 |
| JP | 2199263 A | 8/1990 |
| JP | 2011121541 A | 6/2011 |
| KR | 20110109453 A | 10/2011 |
| WO | 2011088830 A1 | 7/2011 |
| WO | 2013134453 A1 | 9/2013 |
| WO | 2014086414 A1 | 6/2014 |
| WO | 2015106238 A1 | 7/2015 |

OTHER PUBLICATIONS

Notification of Transmittal of the International Search Report and the Written Opinion of the International Searching okuthority, or the Declaration for International Application No. PCT/US2017/034053; Report dated Aug. 8, 2017; Report Received Date: Aug. 14, 2017; 13 pages.
First Office Action for Application No. 201780032500; Office Action dated Jun. 3, 2020; Office Action Received Date: Aug. 1, 2020; 16 pages.

* cited by examiner

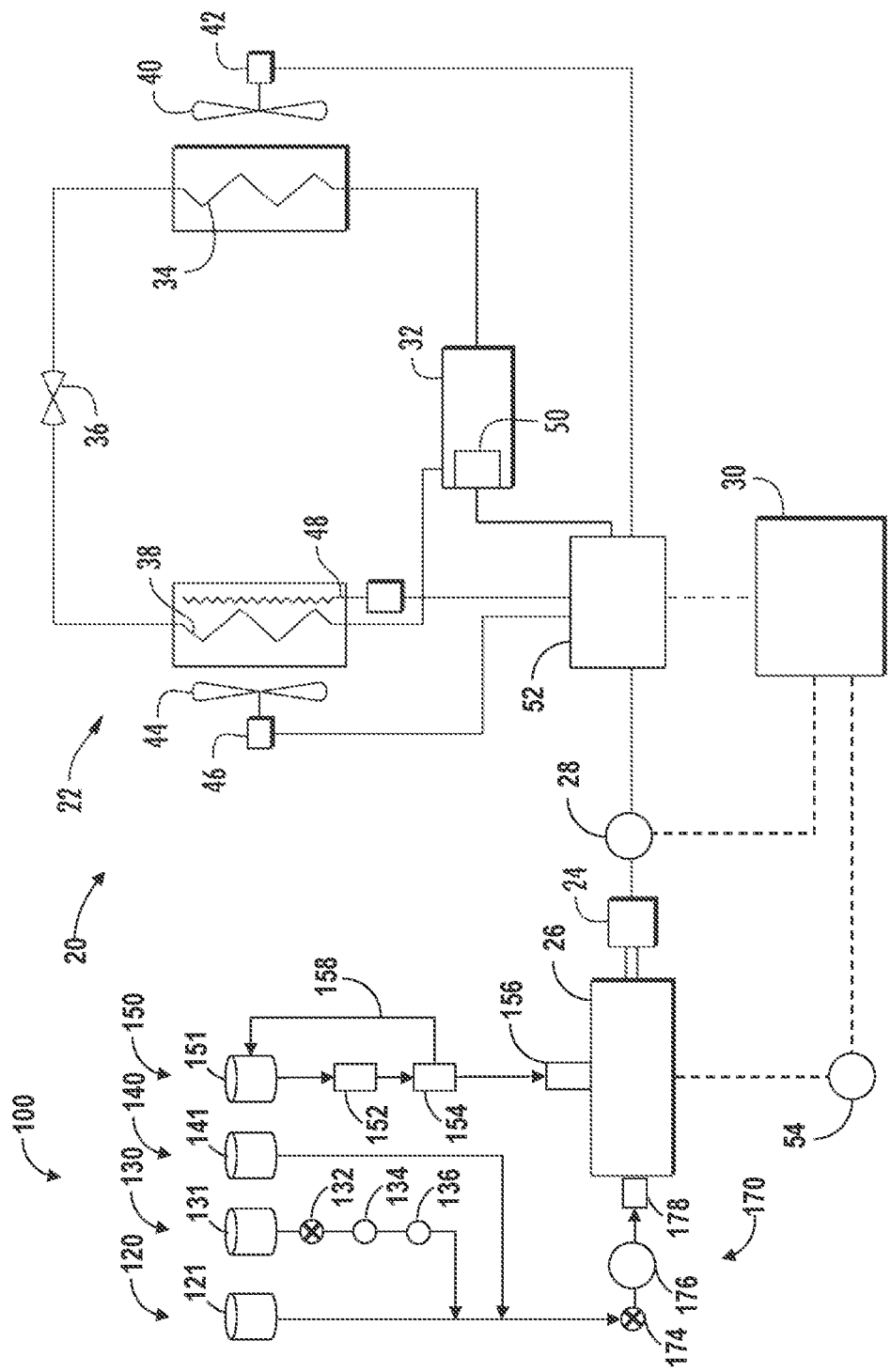

US 10,941,713 B2

MULTI-FUEL TRANSPORT REFRIGERATION UNIT

BACKGROUND OF THE DISCLOSURE

The embodiments herein generally relate to transport refrigeration systems and more specifically, the fuel systems of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover (engine). In mechanically driven transport refrigeration systems the compressor is driven by the engine, either through a direct mechanical coupling or a belt drive, and other components, such as the condenser and evaporator fans are belt driven.

An "all electric" transport refrigeration system for a refrigerated trailer application is also commercially available through Carrier Corporation. In the all electric transport refrigeration system, an engine carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

In the case of refrigerated trailers, the engine typically comprises a diesel engine carried on and considered part of the transport refrigeration system. However in many cases, while the engine for the refrigeration unit may be diesel, the engine of the truck may be powered by another fuel, such as, for example gasoline, natural gas, or propane. If the engine runs on a different fuel than the truck, then it will lead to multiple stops to pick up different fuels at different locations. Incurring multiple stops to fuel the truck and the engine at different locations is a waste of valuable time and thus, a more efficient solution is desired.

BRIEF DESCRIPTION OF THE DISCLOSURE

According to one embodiment, a transport refrigeration system is provided. The transport refrigeration system having: a multi-fuel capable engine; a refrigeration unit powered by the engine; a first fuel system operably connected to the engine, the first fuel system including at least one of a propane fuel system, a compressed natural gas fuel system, a liquefied natural gas fuel system, and a gasoline fuel system; a second fuel system operably connected to the engine, the second fuel system including at least one of a propane fuel system, a compressed natural gas fuel system, a liquefied natural gas fuel system, and a gasoline fuel system; and a controller configured to command a fuel to the engine from the first fuel system or the second fuel system, the controller being configured to adjust the operation of the engine in response to the fuel commanded. The first fuel system operates on a fuel different than the second fuel system. The first fuel system and the second fuel system are separate modules being removably connected to the engine.

In addition to one or more of the features described above, or as an alternative, further embodiments of the transport refrigeration system may include a common fuel regulation system having: an engine lock off valve; a vaporizer fluidly connected to the engine lock off valve; and an electronic fuel pressure regulator fluidly connecting the vaporizer to the engine. The propane fuel system, compressed natural gas fuel system, and the liquefied natural gas system are fluidly connected to engine lock off valve. The electronic pressure regulator is configured to adjust the fuel flow to the engine in response to a command from the controller.

In addition to one or more of the features described above, or as an alternative, further embodiments of the transport refrigeration system may include that the propane fuel system further includes: a propane tank; an engine lock off valve fluidly connected to the propane tank; a vaporizer fluidly connected to the engine lock off valve; and an electronic fuel pressure regulator fluidly connecting the vaporizer to the engine.

In addition to one or more of the features described above, or as an alternative, further embodiments of the transport refrigeration system may include that the compressed natural gas fuel system further includes: a compressed natural gas tank; a tank lock off valve fluidly connected to the compressed natural gas tank; a high pressure regulator fluidly connected to the tank lock off valve; a low pressure regulator fluidly connected to the high pressure regulator; an engine lock off valve fluidly connected to the low pressure regulator; a vaporizer fluidly connected to the engine lock off valve; and an electronic fuel pressure regulator fluidly connecting the vaporizer to the engine.

In addition to one or more of the features described above, or as an alternative, further embodiments of the transport refrigeration system may include that the liquefied natural gas fuel system further includes: a liquefied natural gas tank; an engine lock off valve fluidly connected to the liquefied natural gas tank; a vaporizer fluidly connected to the engine lock off valve; and an electronic fuel pressure regulator fluidly connecting the vaporizer to the engine.

In addition to one or more of the features described above, or as an alternative, further embodiments of the transport refrigeration system may include that the gasoline fuel system further includes: a gasoline tank; a fuel pump fluidly connected to the gasoline tank; a fuel pressure manifold fluidly connected to the fuel pump; a fuel return line fluidly connecting the fuel pressure manifold to the gasoline tank; and a fuel injector fluidly connecting the fuel pressure manifold to the engine.

According to one embodiment, a method of operating a transport refrigeration system. The method having the steps of: operating a multi-fuel capable engine; powering, using the engine, a refrigeration unit; fueling the engine, using a first fuel system operably connected to the engine or a second fuel system operably connected to the engine, the first fuel system including at least one of a propane fuel system, a compressed natural gas fuel system, a liquefied natural gas fuel system, and a gasoline fuel system, the second fuel system including at least one of a propane fuel system, a compressed natural gas fuel system, a liquefied natural gas fuel system, and a gasoline fuel system; and commanding, using a controller, a fuel to the engine from the first fuel system or the second fuel system, the controller being configured to adjust the operation of the engine in response to the fuel commanded. The first fuel system operates on a fuel different than the second fuel system. The first fuel system and the second fuel system are separate modules being removably connected to the engine.

In addition to one or more of the features described above, or as an alternative, further embodiments of the method may include regulating, using a common fuel regulation system, fuel flow into the engine. The common fuel regulation system having: an engine lock off valve; a vaporizer fluidly connected to the engine lock off valve; and an electronic fuel pressure regulator fluidly connecting the vaporizer to the engine. The propane fuel system, compressed natural gas fuel system, and the liquefied natural gas system are fluidly connected to engine lock off valve. The electronic pressure regulator is configured to adjust the fuel flow to the engine in response to a command from the controller.

In addition to one or more of the features described above, or as an alternative, further embodiments of the method may include that the propane fuel system further includes: a propane tank; an engine lock off valve fluidly connected to the propane tank; a vaporizer fluidly connected to the engine lock off valve; and an electronic fuel pressure regulator fluidly connecting the vaporizer to the engine.

In addition to one or more of the features described above, or as an alternative, further embodiments of the method may include that the compressed natural gas fuel system further includes: a compressed natural gas tank; a tank lock off valve fluidly connected to the compressed natural gas tank; a high pressure regulator fluidly connected to the tank lock off valve; a low pressure regulator fluidly connected to the high pressure regulator; an engine lock off valve fluidly connected to the low pressure regulator; a vaporizer fluidly connected to the engine lock off valve; and an electronic fuel pressure regulator fluidly connecting the vaporizer to the engine.

In addition to one or more of the features described above, or as an alternative, further embodiments of the method may include that the liquefied natural gas fuel system further includes: a liquefied natural gas tank; an engine lock off valve fluidly connected to the liquefied natural gas tank; a vaporizer fluidly connected to the engine lock off valve; and an electronic fuel pressure regulator fluidly connecting the vaporizer to the engine.

In addition to one or more of the features described above, or as an alternative, further embodiments of the method may include that the gasoline fuel system further includes: a gasoline tank; a fuel pump fluidly connected to the gasoline tank; a fuel pressure manifold fluidly connected to the fuel pump; a fuel return line fluidly connecting the fuel pressure manifold to the gasoline tank; and a fuel injector fluidly connecting the fuel pressure manifold to the engine.

According to one embodiment, a controller of a transport refrigeration system is provided. The controller having: a processor; a memory having computer-executable instructions that, when executed by the processor, cause the processor to perform operations. The operations having the steps of: operating a multi-fuel capable engine; powering a refrigeration unit with the engine; fueling the engine, using a first fuel system operably connected to the engine or a second fuel system operably connected to the engine, the first fuel system including at least one of a propane fuel system, a compressed natural gas fuel system, a liquefied natural gas fuel system, and a gasoline fuel system, the second fuel system including at least one of a propane fuel system, a compressed natural gas fuel system, a liquefied natural gas fuel system, and a gasoline fuel system; and commanding a fuel to the engine from the first fuel system or the second fuel system, the controller being configured to adjust the operation of the engine in response to the fuel commanded. The first fuel system operates on a fuel different than the second fuel system. The first fuel system and the second fuel system are separate modules being removably connected to the engine.

In addition to one or more of the features described above, or as an alternative, further embodiments of the controller may include that the operation further include: regulating fuel flow into the engine with a common fuel regulation system. The common fuel regulation system having: an engine lock off valve; a vaporizer fluidly connected to the engine lock off valve; and an electronic fuel pressure regulator fluidly connecting the vaporizer to the engine. The propane fuel system, compressed natural gas fuel system, and the liquefied natural gas system are fluidly connected to engine lock off valve. The electronic pressure regulator is configured to adjust the fuel flow to the engine in response to a command from the controller.

In addition to one or more of the features described above, or as an alternative, further embodiments of the controller may include that the propane fuel system further includes a propane tank; an engine lock off valve fluidly connected to the propane tank; a vaporizer fluidly connected to the engine lock off valve; and an electronic fuel pressure regulator fluidly connecting the vaporizer to the engine.

In addition to one or more of the features described above, or as an alternative, further embodiments of the controller may include that the compressed natural gas fuel system further includes: a compressed natural gas tank; a tank lock off valve fluidly connected to the compressed natural gas tank; a high pressure regulator fluidly connected to the tank lock off valve; a low pressure regulator fluidly connected to the high pressure regulator; an engine lock off valve fluidly connected to the low pressure regulator; a vaporizer fluidly connected to the engine lock off valve; and an electronic fuel pressure regulator fluidly connecting the vaporizer to the engine.

In addition to one or more of the features described above, or as an alternative, further embodiments of the controller may include that the liquefied natural gas fuel system further includes: a liquefied natural gas tank; an engine lock off valve fluidly connected to the liquefied natural gas tank; a vaporizer fluidly connected to the engine lock off valve; and an electronic fuel pressure regulator fluidly connecting the vaporizer to the engine.

In addition to one or more of the features described above, or as an alternative, further embodiments of the controller may include the gasoline fuel system further includes: a gasoline tank; a fuel pump fluidly connected to the gasoline tank; a fuel pressure manifold fluidly connected to the fuel pump; a fuel return line fluidly connecting the fuel pressure manifold to the gasoline tank; and a fuel injector fluidly connecting the fuel pressure manifold to the engine.

Technical effects of embodiments of the present disclosure include operating an engine of a transport unit with a variety of different fuels without replacing the engine or making major alterations to the system. Further technical effects of embodiments of the present disclosure include fueling an engine of a transport refrigeration unit with propane, compressed natural gas, liquefied natural gas, or gasoline.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

FIG. 1 is a schematic illustration of a transport refrigeration system having a multi-fuel distribution system in accordance with the disclosure.

DETAILED DESCRIPTION OF THE DISCLOSURE

Referring to FIG. 1, a transport refrigeration system 20 includes a refrigeration unit 22, an electric generation device 24, an engine (prime mover) 26 for driving the electric generation device 24, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric resistance heater 48. The controller 30 may also be able to selectively operate the engine 26, typically through an electronic engine controller 54 operatively associated with the engine 26.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger 38.

The engine 26 is an on-board fossil-fuel engine that drives the electric generation device 24, which generates electrical power. In an embodiment, the engine 26 is a multi-fuel capable engine that can run on propane, compressed natural gas, liquefied natural gas, or gasoline. The engine 26 may be a spark ignited engine, which are commonly used in industrial applications, such as, for example fork lifts or generator sets. The drive shaft of the engine drives the shaft of the electric generation device 24. In an electrically powered embodiment of the transport refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. The refrigeration system 20 has a voltage sensor 28 to sense the voltage of the electric generation device 24. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate.

In the illustrated embodiment, fuel is delivered to the engine 26 through a multi-fuel distribution system 100. The multi-fuel distribution systems 100 may include at least one fuel system. The fuel systems may include a propane fuel system 120, a compressed natural gas fuel system 130, a liquefied natural gas fuel system 140, and a gasoline fuel system 150. The fuel systems are separate modules, each module being removably connected to the engine 26, meaning that all four different fuel system types may be included in the multi-fuel distribution system 100 or any combination of the four different fuel systems. A fuel system may be removed without affecting the other fuels systems. Further, the controller 30 is configured to command a fuel to the engine 26 from one of the fuel systems. The controller 30 is also configured to adjust the operation of the engine 26 in response to the fuel commanded. The fuel may be commanded directly on the refrigeration unit 22 or via a user device such as, for example a cellular phone, pager, tablet, laptop, smartwatch, desktop computer, truck dashboard display, simple jumper, or any similar device known to one of ordinary skill in the art. The fuel selection may also be controlled automatically by the controller 30 based on a selected fuel variable, such as, for example, fuel price.

As seen in FIG. 1, the propane fuel system 120, the compressed natural gas fuel system 130, and the liquefied natural gas fuel system 140 share a common fuel regulation system 170. The common fuel regulation system 170 includes: an engine lock off valve 174; a vaporizer 176 fluidly connected to the engine lock off valve 174; and an electronic fuel pressure regulator 178 fluidly connecting the vaporizer 176 to the engine 26. The propane fuel system 120, the compressed natural gas fuel system 130, and the liquefied natural gas fuel system 140 are each fluidly connected to the engine lock off valve 174. The electronic pressure regulator 178 is configured to adjust the fuel flow to the engine 26 in response to a command from the controller 30. Adjusting the fuel flow may include allowing the fuel commanded by the controller 30 to proceed to the engine 26, while preventing the non-commanded fuels from proceeding to the engine 26. The engine lock off valve 174 is configured to shut off the fuel flow to the engine 26 when the engine 26 is not in the start sequence or running.

In the illustrated embodiment, the propane fuel system 120 comprises: a propane tank 121; the engine lock off valve 174 fluidly connected to the propane tank 121; a vaporizer 176 fluidly connected to the engine lock off valve 174; and an electronic fuel pressure regulator 178 fluidly connecting the vaporizer 176 to the engine 26. The engine lock off valve 174, the vaporizer 176, and the electronic fuel pressure regulator 178 are part of the common fuel regulation system 170, as discussed above. The propane tank 121 may be removed from the multi-fuel distribution system 100 when the propane fuel system 120 is not needed. If the propane fuel system 120, the compressed natural gas fuel system 130, and the liquefied natural gas fuel system 140 are all not needed, these fuel systems may be removed from the multi-fuel distribution system 100 along with the common fuel regulation system 170.

In the illustrated embodiment, the compressed natural gas fuel system 130 comprises: a compressed natural gas tank 131; a tank lock off valve 132 fluidly connected to the compressed natural gas tank 131; a high pressure regulator 134 fluidly connected to the tank lock off valve 132; a low pressure regulator 136 fluidly connected to the high pressure regulator 134; an engine lock off valve 174 fluidly connected to the low pressure regulator 136; a vaporizer 176 fluidly connected to the engine lock off valve 174; and an electronic fuel pressure regulator 178 fluidly connecting the vaporizer 176 to the engine 26. The high pressure regulator 134 and the low pressure regulator 136 step down (i.e. reduce) the pressure of the compressed natural gas, which is stored at a high pressure in the compressed natural gas tank 131 but needs to be depressurized for consumption by the engine 26. The engine lock off valve 174, the vaporizer 176, and the electronic fuel pressure regulator 178 are part of the common fuel regulation system 170, as discussed above. The compressed natural gas tank 131, tank lock off valve 132, high pressure regulator 134, and low pressure regulator 136 may be removed from the multi-fuel distribution system 100 when compressed natural gas fuel system 130 is not needed. If the propane fuel system 120, the compressed natural gas fuel system 130, and the liquefied natural gas fuel system 140 are all not needed, these fuel systems may be removed from the multi-fuel distribution system 100 along with the common fuel regulation system 170.

In the illustrated embodiment, the liquefied natural gas fuel system 140 comprises: a liquefied natural gas tank 141; an engine lock off valve 174 fluidly connected to the liquefied natural gas tank 141; a vaporizer or regulator 176 fluidly connected to the engine lock off valve 174; and an electronic fuel pressure regulator 178 fluidly connecting the vaporizer 176 to the engine 26. The vaporizer 176 may be a vaporizer and/or a regulator. The engine lock off valve 174, the vaporizer 176, and the electronic fuel pressure regulator 178 are part of the common fuel regulation system 170, as discussed above. The liquefied natural gas tank 141 may be removed from the multi-fuel distribution system 100 when the liquefied natural gas fuel system 140 is not needed. If the propane fuel system 120, the compressed natural gas fuel system 130, and the liquefied natural gas fuel system 140 are all not needed, these fuel systems may be removed from the multi-fuel distribution system 100 along with the common fuel regulation system 170. As may be appreciated by one of skill in the art, the liquefied natural gas tank 141 may include a regulator (not shown) and vaporizer(not shown).

In the illustrated embodiment, the gasoline fuel system 150 comprises a gasoline tank 151; a fuel pump 152 fluidly connected to the gasoline tank 151; a fuel pressure manifold 154 fluidly connected to the fuel pump 152; a fuel return line 158 fluidly connecting the fuel pressure manifold 154 to the gasoline tank 151; and a fuel injector 156 fluidly connecting the fuel pressure manifold 154 to the engine 26. The fuel pump 152 pumps gasoline through the gasoline fuel system 150 and the fuel pressure manifold 154 regulates the pressure of the gasoline in the gasoline fuel system 150. The return line 158 returns gasoline from the fuel pressure manifold 154 to the gasoline tank 151 as required. The gasoline tank 151, fuel pump 152, fuel pressure manifold 154, and fuel return line 158 may be removed from the multi-fuel distribution system 100 when the gasoline fuel system 150 is not needed. The fuel injectors 156 may remain in the engine 26.

Further, the engine 26 may have two separate fuel inlet points, one at the fuel injectors 156 for the gasoline fuel system 150 and another at the electronic fuel pressure regulator 178 for the propane fuel system 120, the compressed natural gas fuel system 130, and the liquefied natural gas fuel system 140. As mentioned above the fuel systems are each removable and the multi-fuel distribution system 100 may be configured with any combination of these fuels systems. The controller 30 adjusts the performance of the engine 26 based on the desired fuel. For example, the controller 30 may adjust fuel delivery rate and/or spark advance in the engine 26 depending on the fuel. The controller 26 will also control which fuel system is supplying the engine 26 with fuel.

Advantageously, a multi-fuel distribution system creates flexibility for the operators of transport refrigeration systems and allows the operators to run the engine of the refrigeration unit on a variety of fuels. Also advantageously, a multi-fuel system creates efficiency allowing operators of transport refrigeration systems to fuel the refrigeration unit with the same fuel they use to fill up their truck, which helps to avoid multiple stops for different fuels. Further advantageously, due to the flexibility of a multi-fuel system, the refrigeration system could be mixed and matched daily with different trucks without a need to change the engine of the refrigeration unit.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A transport refrigeration system comprising:
   a multi-fuel capable engine;
   a refrigeration unit powered by the engine;
   a gasoline fuel system operably connected to the engine;
   a propane fuel system operably connected to the engine; and
   a natural gas fuel system operably connected to the engine, the natural gas fuel system including at least one of a compressed natural gas fuel system or a liquefied natural gas fuel system;
   a controller configured to command a fuel to the engine from the gasoline fuel system, the propane fuel system or the natural gas fuel system, the controller being configured to adjust the operation of the engine in response to the fuel commanded;
   wherein the gasoline fuel system, the propane fuel system, and natural gas fuel system are separate modules being removably connected to the engine.

2. The transport refrigeration system of claim 1, further comprising:
   a common fuel regulation system comprising:
      an engine lock off valve;
      a vaporizer fluidly connected to the engine lock off valve; and
      an electronic fuel pressure regulator fluidly connecting the vaporizer to the engine;
         wherein the propane fuel system and any of the compressed natural gas fuel system and the liquefied natural gas system are fluidly connected to engine lock off valve,
         wherein the electronic pressure regulator is configured to adjust the fuel flow to the engine in response to a command from the controller.

3. The transport refrigeration system of claim 1, wherein the propane fuel system further comprises:
   a propane tank;
   an engine lock off valve fluidly connected to the propane tank;
   a vaporizer fluidly connected to the engine lock off valve; and
   an electronic fuel pressure regulator fluidly connecting the vaporizer to the engine.

4. The transport refrigeration system of claim 1, wherein the compressed natural gas fuel system further comprises:
   a compressed natural gas tank;
   a tank lock off valve fluidly connected to the compressed natural gas tank;
   a high pressure regulator fluidly connected to the tank lock off valve;
   a low pressure regulator fluidly connected to the high pressure regulator;
   an engine lock off valve fluidly connected to the low pressure regulator;
   a vaporizer fluidly connected to the engine lock off valve; and
   an electronic fuel pressure regulator fluidly connecting the vaporizer to the engine.

5. The transport refrigeration system of claim 1, wherein the liquefied natural gas fuel system further comprises:
   a liquefied natural gas tank;
   an engine lock off valve fluidly connected to the liquefied natural gas tank;

a vaporizer fluidly connected to the engine lock off valve; and an electronic fuel pressure regulator fluidly connecting the vaporizer to the engine.

6. The transport refrigeration system of claim 1, wherein the gasoline fuel system further comprises:
   a gasoline tank;
   a fuel pump fluidly connected to the gasoline tank;
   a fuel pressure manifold fluidly connected to the fuel pump;
   a fuel return line fluidly connecting the fuel pressure manifold to the gasoline tank; and
   a fuel injector fluidly connecting the fuel pressure manifold to the engine.

7. A method of operating a transport refrigeration system, the method comprising:
   operating a multi-fuel capable engine;
   powering, using the engine, a refrigeration unit;
   fueling the engine, using a gasoline fuel system operably connected to the engine, a propane fuel system operably connected to the engine, or a natural gas fuel system operably connected to the engine,
   the natural gas fuel system including at least one a compressed natural gas fuel system or a liquefied natural gas fuel system; and
   commanding, using a controller, a fuel to the engine from the gasoline fuel system, the propane fuel system or the natural gas fuel system, the controller being configured to adjust the operation of the engine in response to the fuel commanded,
   wherein the gasoline fuel system, the propane fuel system, and the natural gas fuel system are separate modules being removably connected to the engine.

8. The method of claim 7, further comprising:
   regulating, using a common fuel regulation system, fuel flow into the engine, the common fuel regulation system comprising:
      an engine lock off valve;
      a vaporizer fluidly connected to the engine lock off valve; and
      an electronic fuel pressure regulator fluidly connecting the vaporizer to the engine,
      wherein the propane fuel system and any of the compressed natural gas fuel system and the liquefied natural gas system are fluidly connected to engine lock off valve,
      wherein the electronic pressure regulator is configured to adjust the fuel flow to the engine in response to a command from the controller.

9. The method of claim 7, wherein the propane fuel system further comprises:
   a propane tank;
   an engine lock off valve fluidly connected to the propane tank;
   a vaporizer fluidly connected to the engine lock off valve; and
   an electronic fuel pressure regulator fluidly connecting the vaporizer to the engine.

10. The method of claim 7, wherein the compressed natural gas fuel system further comprises:
    a compressed natural gas tank;
    a tank lock off valve fluidly connected to the compressed natural gas tank;
    a high pressure regulator fluidly connected to the tank lock off valve;
    a low pressure regulator fluidly connected to the high pressure regulator;
    an engine lock off valve fluidly connected to the low pressure regulator;
    a vaporizer fluidly connected to the engine lock off valve; and
    an electronic fuel pressure regulator fluidly connecting the vaporizer to the engine.

11. The method of claim 7, wherein the liquefied natural gas fuel system further comprises:
    a liquefied natural gas tank;
    an engine lock off valve fluidly connected to the liquefied natural gas tank;
    a vaporizer fluidly connected to the engine lock off valve; and
    an electronic fuel pressure regulator fluidly connecting the vaporizer to the engine.

12. The method of claim 7, wherein the gasoline fuel system further comprises:
    a gasoline tank;
    a fuel pump fluidly connected to the gasoline tank;
    a fuel pressure manifold fluidly connected to the fuel pump;
    a fuel return line fluidly connecting the fuel pressure manifold to the gasoline tank; and
    a fuel injector fluidly connecting the fuel pressure manifold to the engine.

13. A controller of a transport refrigeration system comprising:
    a processor;
    a memory comprising computer-executable instructions that, when executed by the processor, cause the processor to perform operations, the operations comprising:
       operating a multi-fuel capable engine;
       powering a refrigeration unit with the engine;
       fueling the engine, using a gasoline fuel system operably connected to the engine, a propane fuel system operably connected to the engine or a liquefied natural gas fuel system; and
       commanding a fuel to the engine from the gasoline fuel system, the propane fuel system or the natural gas fuel system, the controller being configured to adjust the operation of the engine in response to the fuel commanded,
       wherein the gasoline fuel system, the propane fuel system, and the natural gas fuel system are separate modules being removably connected to the engine.

14. The controller of claim 13, wherein the operations further comprise:
    regulating fuel flow into the engine with a common fuel regulation system, the common fuel regulation system comprising:
       an engine lock off valve;
       a vaporizer fluidly connected to the engine lock off valve; and
       an electronic fuel pressure regulator fluidly connecting the vaporizer to the engine,
          wherein the propane fuel system and any of the compressed natural gas fuel system and the liquefied natural gas system are fluidly connected to engine lock off valve,
          wherein the electronic pressure regulator is configured to adjust the fuel flow to the engine in response to a command from the controller.

15. The controller of claim 13, wherein the propane fuel system further comprises:
    a propane tank;

an engine lock off valve fluidly connected to the propane tank;

a vaporizer fluidly connected to the engine lock off valve; and an electronic fuel pressure regulator fluidly connecting the vaporizer to the engine.

16. The controller of claim 13, wherein the compressed natural gas fuel system further comprises:

a compressed natural gas tank;

a tank lock off valve fluidly connected to the compressed natural gas tank;

a high pressure regulator fluidly connected to the tank lock off valve;

a low pressure regulator fluidly connected to the high pressure regulator;

an engine lock off valve fluidly connected to the low pressure regulator;

a vaporizer fluidly connected to the engine lock off valve; and an electronic fuel pressure regulator fluidly connecting the vaporizer to the engine.

17. The controller of claim 13, wherein the liquefied natural gas fuel system further comprises:

a liquefied natural gas tank;

an engine lock off valve fluidly connected to the liquefied natural gas tank;

a vaporizer fluidly connected to the engine lock off valve; and an electronic fuel pressure regulator fluidly connecting the vaporizer to the engine.

18. The controller of claim 13, wherein the gasoline fuel system further comprises:

a gasoline tank;

a fuel pump fluidly connected to the gasoline tank;

a fuel pressure manifold fluidly connected to the fuel pump;

a fuel return line fluidly connecting the fuel pressure manifold to the gasoline tank; and a fuel injector fluidly connecting the fuel pressure manifold to the engine.

* * * * *